United States Patent Office 3,020,055
Patented Feb. 6, 1962

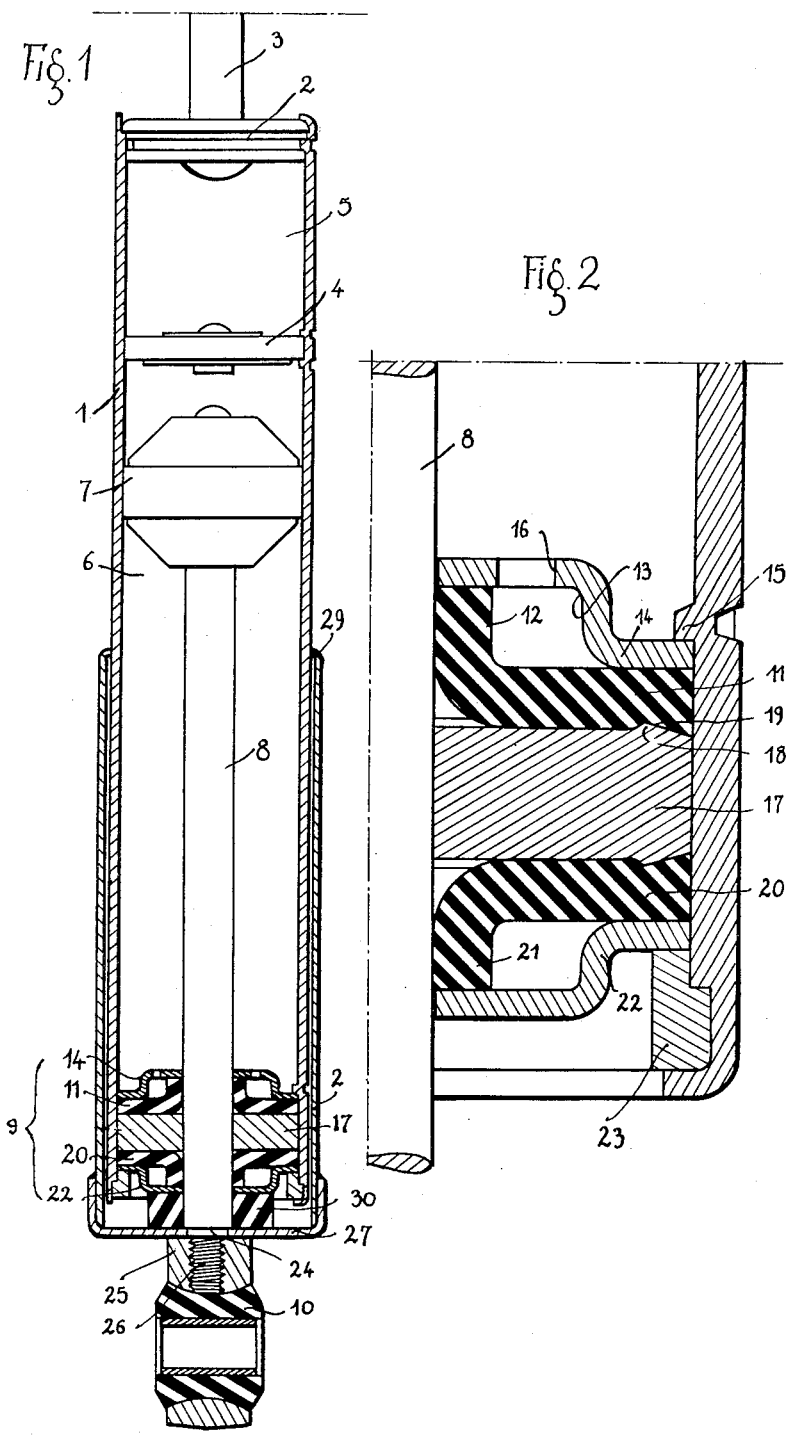

3,020,055
FLUID-TIGHT JOINT PROTECTED AGAINST DUST FOR TELESCOPIC SHOCK-ABSORBERS OF AUTOMOBILE VEHICLES
Fernand Stanislas Allinquant, 6–10 Rue Olier, Paris, France
Filed July 11, 1958, Ser. No. 747,943
Claims priority, application France July 30, 1957
1 Claim. (Cl. 277—187)

The fluid-tight member, formed at the exit of the piston rod from the cylinder of a telescopic shock-absorber by a lip joint subjected to the internal pressure of the cylinder, is well-known. This joint is constituted by a rubber washer; its periphery, having a slightly larger diameter than that of the bore, is forced into the bore and is gripped between two supporting washers fixed in the cylinder; its internal portion, of which the diameter at rest is appreciably less than the diameter of the piston rod, is deformed, during its placing in position, to a reentrant toric lip which is housed inside a central cavity of the internal supporting washer, communicating with the inside of the cylinder by holes pierced in the bottom of this cavity. The lip of the joint washer is thus supported elastically against the rod, both by the effect of its internal tension due to deformation and by the effect of the internal pressure of the cylinder, which ensures continuous fluid tightness.

Now, experience has shown that a joint of this kind is affected by the action of very fine dust which, by adhering to the rod, can reach the level of the sealing lip and cause scratches which adversely affect the efficiency of the joint. This is especially to be feared in hot countries, and particularly in regions close to desert areas. The usual means of protection, such as scrapers and baffles, have proved incapable of preventing the ingress of fine dust.

The present invention on the contrary enables this protection to be ensured in a complete manner by a device which forms part of the method of action of the fluid-tight joint itself, when this is of the type described above. The device according to the invention is characterized by the fact that the outer supporting washer of the lip-joint assembly and the inner supporting washer with a central cavity containing the reentrant lip which ensures the fluid-tightness of the cylinder, is slidably mounted in the bore of the cylinder, supported against a similar outer assembly and with a symmetrical arrangement, of which the supporting washer with a central cavity containing the joint lip directed towards the exterior is fixed in the cylinder in the position of clamping of the two joint washers. On the outer extremity of the piston rod is fixed the bottom of a case sliding over the cylinder and enclosing the bottom of the cylinder through which the said rod passes, and a rubber pad is interposed between the bottom of the said casing and the outer supporting washer with a central cavity.

The invention will be described in the text which follows, in one form of embodiment given by way of example and shown in the accompanying drawings, in which:

FIG. 1 is a view in axial cross-section of the cylinder of a telescopic shock-absorber comprising the protected fluid-tight joint device which forms the object of the invention;

FIG. 2 shows to larger scale, in axial half-cross-section, the extremity of the cylinder provided with this device.

There is designated by 1 in FIG. 1 the steel tube which constitutes, over a part of its length, the cylinder of the shock-absorber. This tube, formed at one extremity by the bottom 2 carrying the attachment rod 3, is divided in the usual manner by a partition 4 into a compensating chamber 5 and the cylinder proper 6, in which slides the piston 7. The piston rod 8 passes at the opposite extremity through the base 9, provided with a fluid-tight member, and terminates at the outside by an attachment member 10.

The fluid-tight member is of the known type with a lip joint subjected to the internal pressure of the cylinder, which has been referred to above. The deformed rubber washer 11 (see FIG. 2) which forms this joint, has its inner lip 12 housed in the central cavity 13 of the inner supporting washer 14 leaning in the cylinder on punched-in portions 15. It is subjected to the internal pressure of the cylinder by means of the perforations 16. Its outer face abuts against a supporting washer 17 which is fairly thick and which is free to slide in the cylinder bore. A circular projection 18 of the supporting face, the outer slope of which is extended in a chamfer 19, tends to apply the periphery of the washer 11 against the bore.

Against the outer face of the said washer 17, and following a symmetrical arrangement, is mounted a deformed rubber protecting washer 20 similar to the joint washer 11; its lip 21, turned towards the exterior, is housed in the central cavity of a supporting washer 22, similar to the supporting washer 14, but which may not be provided with the perforations of the washer 14. This outer supporting washer 22 is held in a position in which it clamps the two rubber washers 11 and 20 by means of a ring 23 fixed in the extremity of the tube by an inset.

On the end of the piston rod 8 (see FIG. 1) the base 27 of a casing is fixed against a shoulder 24 by the gripping action of the threaded end 25 of the attachment member 10 of this rod on a threaded end 26 of the said rod, the lateral wall 28 of the casing surrounding the cylinder 1 with a small space between and slides over the surface of the cylinder by its turned-in extremity 29. A thick pad of rubber 30 is interposed on the rod 8 between the base 27 of the casing and the outer supporting washer 22.

It is unnecessary to revert to the well-known operation of the lip joint 11 and 12 ensuring fluid-tightness against the piston rod 8 at its exit from the cylinder. The device for protection against dust, constituted by the deformed washer 20 with an outer lip, acts under the dependence of the fluid-tight joint; in fact, due to the effect of the pressure inside the cylinder, which assists in forcing the lip 12 of the joint washer 11 against the piston rod, the supporting washer 17 of this joint is forced back outwards and applies a thrust against the inner face of the protection washer 20, thereby helping to support the lip 21 against its support 22, and therefore against the piston rod 8. Thus, this lip 21 is applied strongly against the rod and prevents any penetration of dust into the fluid-tight device; in fact, it plays the known part of a scraper, but with an effectiveness which is due to its pressure against the rod under the combined action of the internal tension of the washer caused by its deformation and, in an almost paradoxical manner, by the internal pressure of the cylinder, which is transmitted by virtue of the freedom of axial movement of the supporting washer 17 of the fluid-tight joint. The elastic pad 30 prevents any violent shock to the device while in the position of maximum compression of the shock absorber. The abutment against this pad has, in addition, an effect similar to the internal pressure of the cylinder; it is converted to an axial force which, by compressing the device, increases the pressure of the lips of the washers 11 and 20 against the piston rod 8.

What I claim is:

A sealing device at the exit of a piston rod from a fluid pressure cylinder, namely for a telescopic shock-absorber, comprising in combination with said cylinder and rod, a middle disc-washer, slidably mounted in one open bore end of said cylinder around said rod, a pair of elastic washers, each having at rest an outer diameter greater than the diameter of said cylinder bore and an inner diameter less than the diameter of said rod, symmetrically backed against the opposite faces of said middle disc-washer within said bore around said rod, and formed with oppositely directed lips pressing said rod, a pair of rigid washers of shallow U-section, each formed with a bored bottom around said rod and with a peripheral flange of a diameter less than that of said cylinder bore, symmetrically disposed for each enclosing one of said elastic washers in close contact of its bottom with the lip of the enclosed elastic washer and of its flange with the peripheral surface thereof, the innermost of said rigid washers having a perforated bottom, abutting means in the cylinder bore for said inner rigid washer, and means in said bore for clamping the peripheral flange of the outer rigid washer and thus holding the formed assembly against said abutting means.

References Cited in the file of this patent

UNITED STATES PATENTS

| | | |
|---|---|---|
| 353,004 | Rider | Nov. 23, 1886 |
| 1,673,751 | Lawrence | June 12, 1928 |
| 2,338,162 | Boor | Jan. 4, 1944 |
| 2,646,859 | Read et al. | July 28, 1953 |

FOREIGN PATENTS

| | | |
|---|---|---|
| 10,875 | Great Britain | of 1910 |
| 91,014 | Germany | of 1896 |